(12) United States Patent  
Harris et al.

(10) Patent No.: US 6,380,656 B1
(45) Date of Patent: Apr. 30, 2002

(54) LIQUID COOLED ALTERNATOR BRUSH HOLDER RIBS

(75) Inventors: Richard Harris, Ann Arbor; Jayeson Fougner, Ypsilanti, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/605,901

(22) Filed: Jun. 28, 2000

(51) Int. Cl.[7] ............................................... H02K 13/00
(52) U.S. Cl. ........................ 310/239; 310/242; 310/247
(58) Field of Search ................................. 310/238, 239, 310/240, 241, 242, 244, 245, 246, 247, 43

(56) References Cited

U.S. PATENT DOCUMENTS

| | | | | |
|---|---|---|---|---|
| 3,497,741 A | * | 2/1970 | Shaler .......................... | 310/239 |
| 3,955,113 A | * | 5/1976 | Hillyer et al. ................ | 310/239 |
| 4,112,321 A | * | 9/1978 | Wan ............................ | 310/249 |
| 4,266,155 A | * | 5/1981 | Niemela ....................... | 310/239 |
| 4,381,468 A | * | 4/1983 | Adam et al. .................. | 310/239 |
| 4,638,204 A | * | 1/1987 | Kirchner et al. ............. | 310/239 |
| 5,114,351 A | * | 5/1992 | Hoffmann ..................... | 439/13 |
| 5,131,822 A | * | 7/1992 | Yamamoto et al. ....... | 417/423.7 |
| 5,686,775 A | * | 11/1997 | Veil et al. .................... | 310/239 |
| 5,753,992 A | * | 5/1998 | Avitable et al. ............. | 310/239 |
| 5,753,994 A | * | 5/1998 | Drexlmaier .................. | 310/239 |
| 6,215,211 B1 | * | 4/2001 | Harris et al. ................. | 310/43 |

* cited by examiner

*Primary Examiner*—Elvin Enad
*Assistant Examiner*—Dang Dinh Le
(74) *Attorney, Agent, or Firm*—John E. Kajander

(57) ABSTRACT

A brush holder assembly (12) for a rotating electrical machine such as an alternator (10) has a cavity (56) therein. The cavity (56) is defined by a first wall (60), a second wall (62), a third wall (64), and a fourth wall (66). The cavity (56) is sized to receive a brush (42) of the rotating electrical machine. One of the walls (60), (62), (64), and (66) comprise a first drafted surface. A positioning rib (70) is provided on at least the drafted surface to position the brush (42) substantially parallel to the longitudinal axis (58) of the cavity (56).

20 Claims, 4 Drawing Sheets

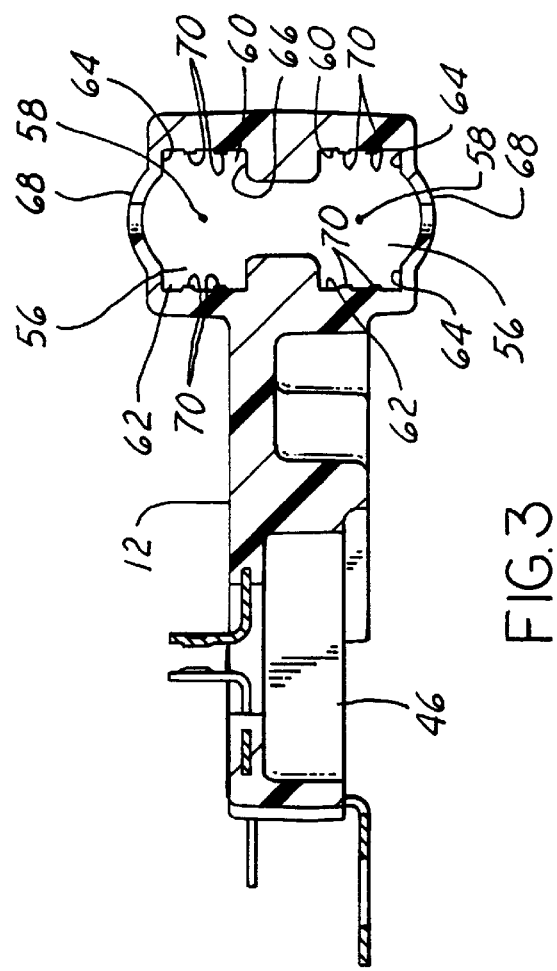
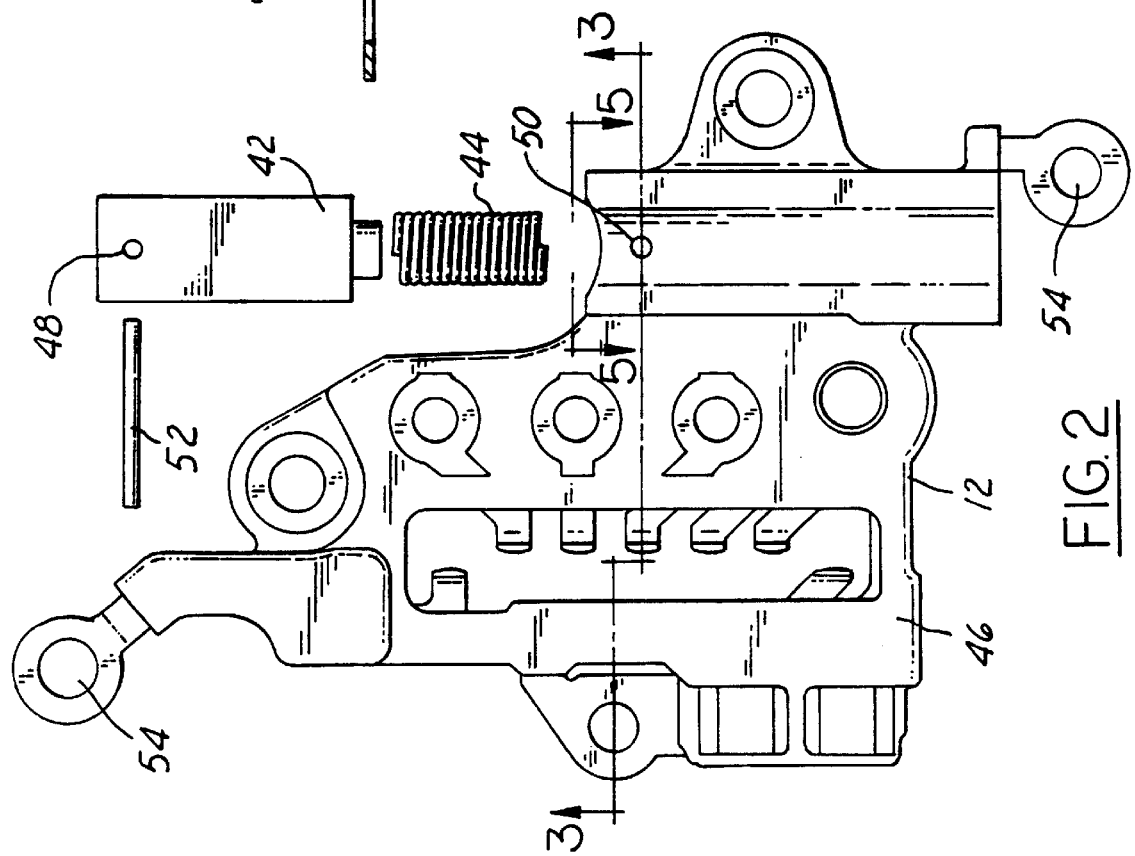
FIG. 3
FIG. 2

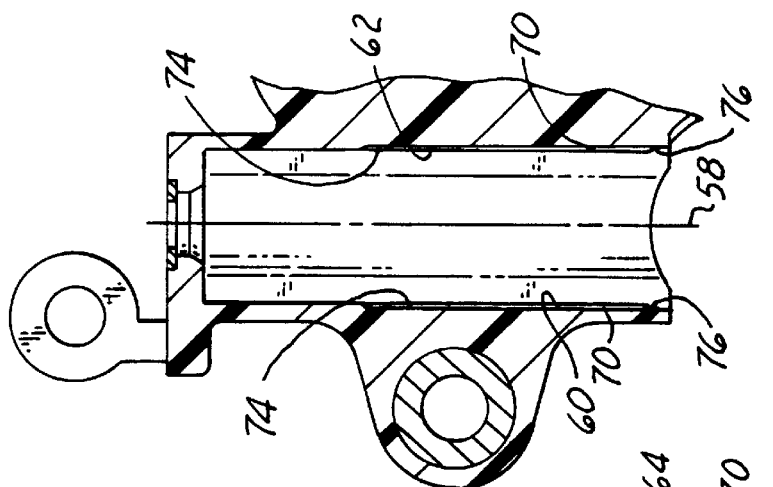
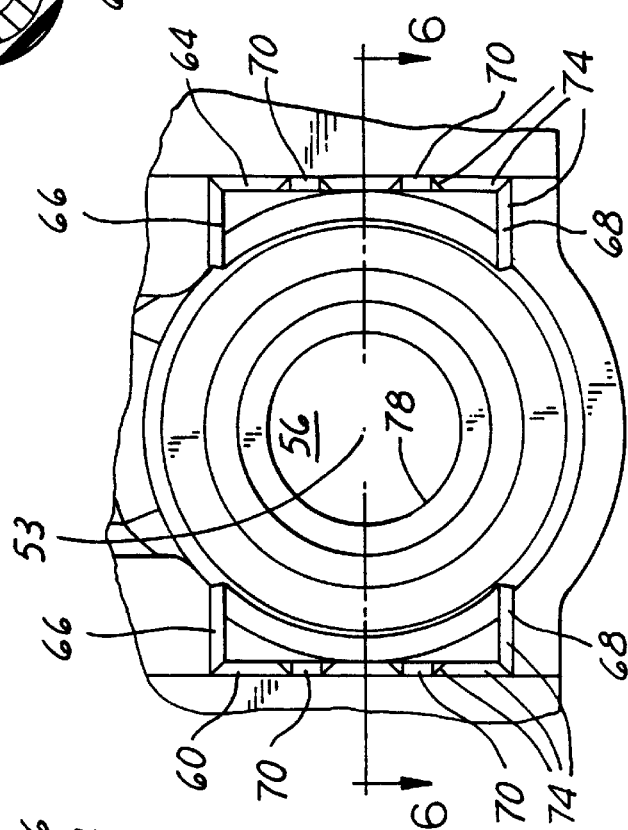
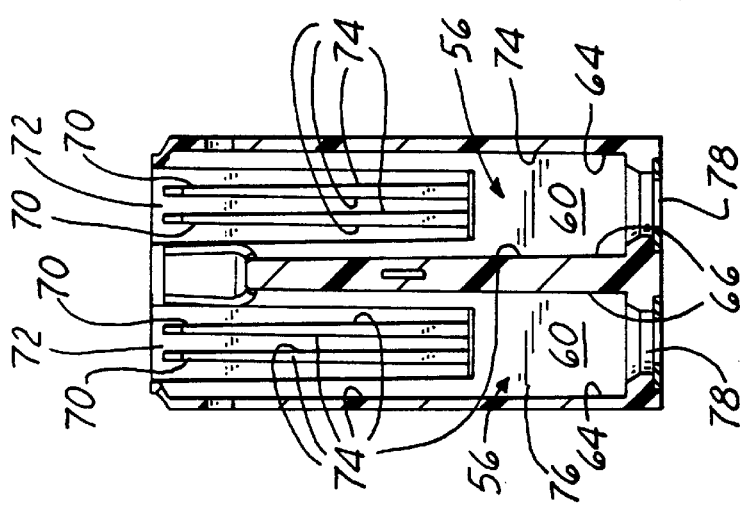

LIQUID COOLED ALTERNATOR BRUSH HOLDER RIBS

TECHNICAL FIELD

The present invention relates generally to rotating electrical machines and, more particularly, to a brush holder for a rotating electrical machine.

BACKGROUND

Electrical machines such as motors, generators, and alternators commonly use brushes made of an electrically conductive material such as carbon to provide electrical power to the rotor of the machine. Typically, two brushes are provided, one as input power and the other as a return path. A brush holder maintains the position of the brushes with respect to the slip rings on the rotor.

Because the brushes are made of carbon, brushes are subject to wear. Once the brushes wear, they must be replaced. To increase the brush wear, the position of the brush should be maintained in a perpendicular orientation to the slip ring.

Known brush holders, however, are commonly molded of a plastic material. In these brush holders, the brush holder cavity is tightly formed around the brush. However, the molding process restricts the tight tolerances. The brush holder cavities are formed with drafted surfaces that are canted slightly from true 90° angles. This allows the mold to be more easily removed. As the brush begins to wear and the end of the brush begins to move further toward the rotor, the brush may move laterally due to the drafted surfaces and therefore not maintain its perpendicular orientation to the slip rings. This allows premature brush wear.

It would therefore be desirable to provide a brush holder that allows the position of the brush to be maintained throughout the life of the brush.

SUMMARY OF THE INVENTION

It is therefore one object to provide a brush holder for a rotating electrical machine that provides increased brush wear by maintaining the brush in a substantially perpendicular orientation to the slip ring.

In one aspect of the invention, a brush holder assembly for rotating electrical machine having a brush comprises a brush holder housing having an elongated cavity therein. The cavity is defined by a first wall, a second wall, a third wall, and a fourth wall. The cavity is sized to receive the brush. The brush cavity has a longitudinal axis that corresponds to the direction of movement of the brush. At least one of the first wall, the second wall, the third wall, and the fourth wall comprise a first drafted surface. A first rib is positioned on the drafted surface. The rib is substantially parallel to the longitudinal axis.

In a further aspect of the invention, the longitudinal axis is perpendicular to the slip ring of the rotor of the rotating electrical machine. One advantage of the invention is that the brush holder ay be easily molded while the ribs maintain the rush in the desired orientation.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 2 is a top view of a brush holder housing with a regulator portion shown partially exploded with a brush and spring.

FIG. 3 is a cross sectional view along line 3—3 of FIG. 2.

FIG. 4 is a cross sectional view along line 4—4 of FIG. 2.

FIG. 5 is a view along line 5—5 of FIG. 2.

FIG. 6 is a cross sectional view along line 6—6 of FIG. 5.

DESCRIPTION OF THE PREFERRED EMBODIMENT

Figure 1A:
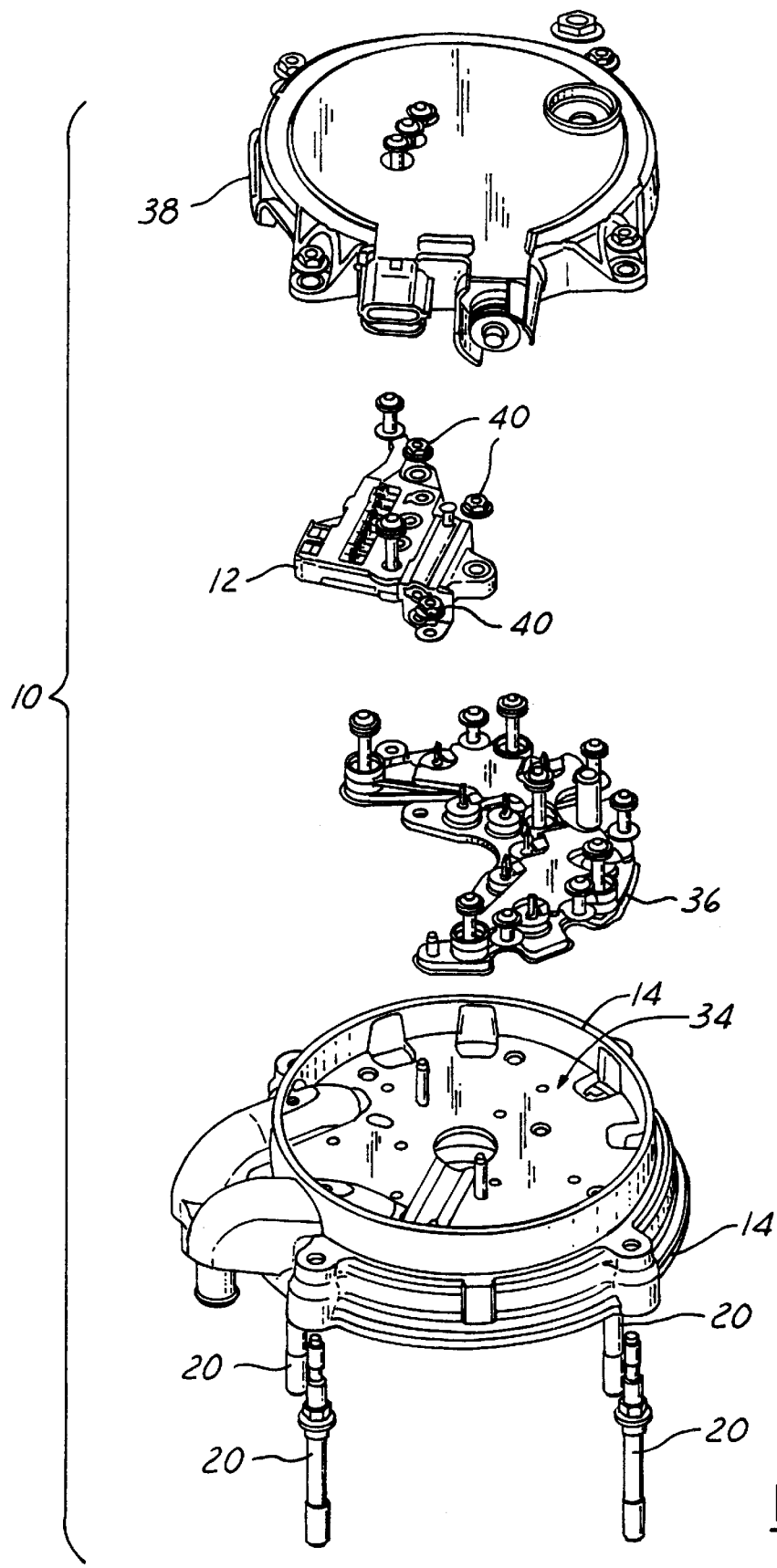
FIGS. 1A and 1B are exploded views of an alternator having a brush holder according to the present invention.

In the following figures the same reference numerals are used to identify the same components in the various views. The present invention is described with respect to an alternator or a generator. However, those skilled in the art will recognize that the present invention is equally applicable to other rotating electrical machines such as wiper motors, starter motors, and other rotating electrical machines using brushes.

Figure 1B:
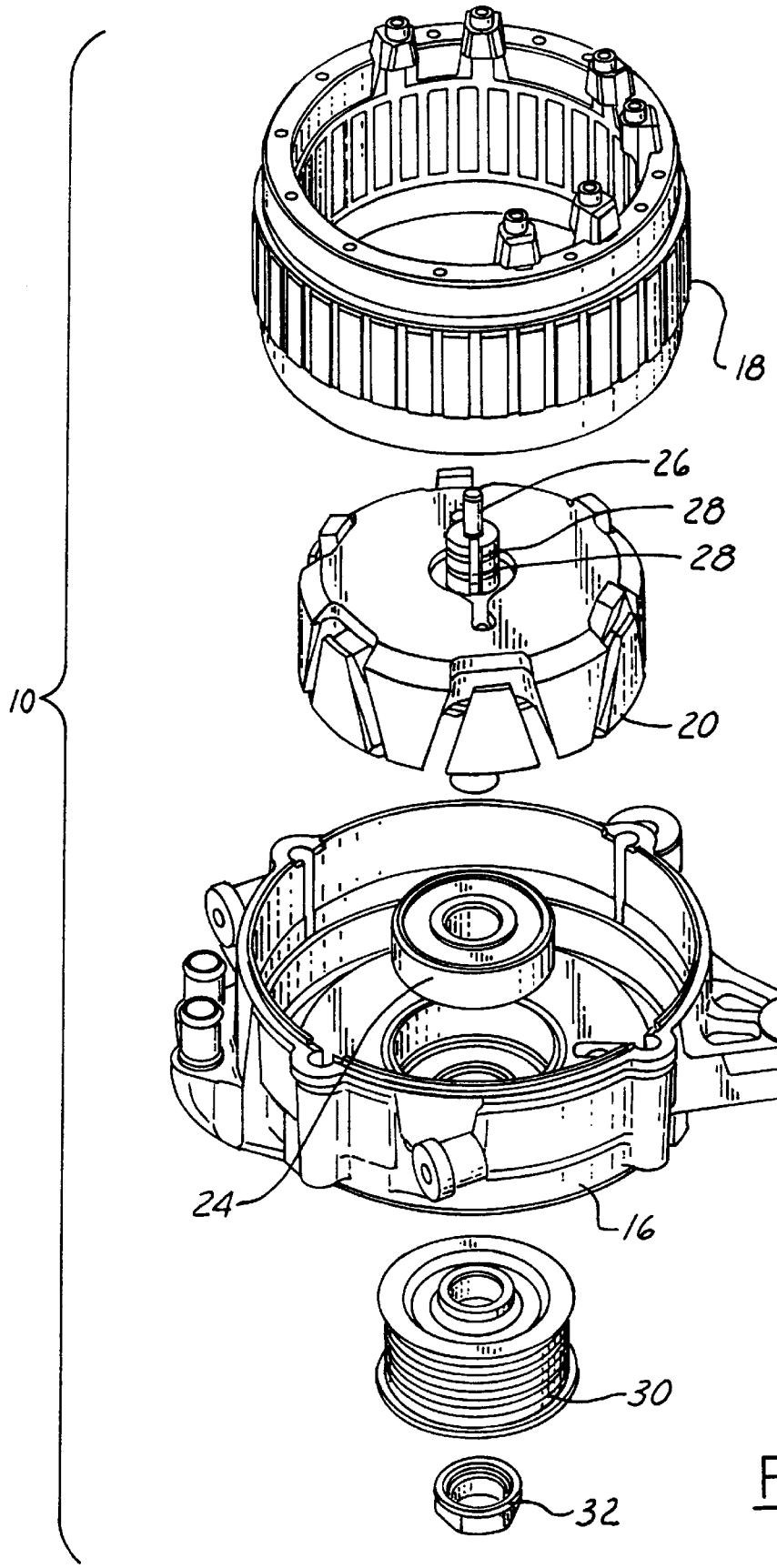

Referring now to FIG. 1, an alternator 10 having a brush holder assembly 12 according to the present invention is illustrated. The configuration of alternator 10 and the position of brush assembly 12 with respect to the alternator may vary depending on the various configurations of alternator 10. Alternator 10 has a first housing portion 14 and a second housing portion 16 that are used to enclose the stator core 18 of the alternator. The first housing portion 14 and the second housing portion 16 are coupled together using fasteners 20. The first housing portion 14 and the second housing portion 16 support a rotor 22 with a bearing 24 in each housing portion 14, 16. As illustrated, rotor 22 is a Lundel type rotor. Rotor 22 has a shaft 26 that supports a pair of parallel spaced apart slip rings 28. The slip rings 28 are electrically coupled to a coil (not shown) within rotor 22. Slip rings 28 provide an electrical connection to a power source as will be further described below. A pulley 30 is coupled to shaft 26 by a nut 32. Pulley 30 couples to an engine or accessory drive belt of the engine so that as the engine crankshaft rotates the drive accessory belt, the rotor is rotated and causes the rotor to generate AC electrical within the stator 18.

First housing 14 has a recess 34 opposite stator 18. Recess 34 is used to house a rectifier bridge 36 and brush holder assembly 12. A cover 38 encloses the brush holder assembly 12 and rectifier bridge 36 within recess 34. Fasteners such as nuts 40 secure brush holder assembly 12 within recess 34.

Referring now to FIG. 2, brush holder assembly 12 includes two brushes 42, only one of which is shown, and a spring 44 both of which are secured within brush holder assembly 12. The spring 44 biases the brush 42 outward from brush holder assembly toward the slip ring 28 of the rotor. A voltage regulator portion 46 may also be formed within brush holder assembly 12. Voltage regulator portion 46 regulates the power to the brush 42 in a conventional manner. Preferably, the voltage regulator portion 46 is assembled together with brush holder assembly 12.

Brush 42 is a generally rectangular shaped brush formed of an electrically conductive material such as carbon. The brush 42 has a hole 48 therethrough. Hole 48 corresponds with hole 50 on brush holder assembly 12. Although optional, holes 48, 50 receive a pin 52 so that during assembly the brush 42 is maintained within brush holder assembly 12. After the brush holder assembly 12 is inserted within the recess 34 and the slip rings 28 of rotor 22 are positioned adjacent to the brush 42, pin 52 may be released so that spring 44 urges brush 42 against the slip ring 28. Various coupling holes 54 may be used to receive fasteners to secure the brush holder assembly within recess 34.

Referring now to FIG. 3, brush holder assembly 12 has a cavity 56 illustrated without a brush therein. Cavity 56 is an elongated cavity with a longitudinal axis 58, the end view of which is shown. Each cavity 56 is preferably mirror image of the other and thus configuration of only one cavity will be described. Cavity 56 is defined by a first wall 60, a second wall 62 opposite first wall, a third wall 64, and a fourth wall 66. First wall 60 and second wall 62 are opposite each other and are substantially parallel to each other. Third wall and fourth wall are positioned opposite each other and are substantially parallel to each other. Although as illustrated third wall 64 has a rounded portion 68, first wall 60 and second wall 62 are substantially perpendicular to third wall 64 and fourth wall 66. The cross-sectional area of cavity 56 substantially corresponds to the cross section of brush 42. As will be further described below, first wall 60, second wall 62, third wall 64, and fourth wall 66 may be drafted inward to facilitate molding. That is, the cross-sectional area of the cavity decreases. That is, first wall 60, second wall 62, third wall 64, and fourth wall 66 may be co-extensive with a drafted surface.

Because it has been found that providing a drafted surface may allow the brush to move relative to cavity 56, a plurality of positioning ribs 70 are provided on first wall 60 and second wall 62. As illustrated, two positioning ribs are provided on first wall 60 and second wall 62. The position of positioning ribs 70 corresponds to the rotational direction of the slip rings 28. Those skilled in the art would recognize that positioning ribs 70 may also be provided on third wall 64 and fourth wall 66.

Referring now to FIG. 4, cavities 56 are illustrated with two positioning ribs 70 on first wall 60. As shown, positioning ribs 70 extend adjacent to the brush opening 72 about two-thirds of the way into cavity 56. Of course, the depth of positioning ribs 70 is provided to maintain the position of the brush with respect to the slip rings. The depth of the positioning ribs 70 depends on various factors including the angle of the drafted surfaces of the wall's defining cavity 56 and the length of the brush. As illustrated, various surfaces are drafted and are generally labeled 74 for each. Even the outer surfaces of rib 70 may have drafted surfaces 74. The amount of drafting of drafted surfaces 74 may vary. Drafted surfaces 74 may have an angle 76 relative to straight walls. Angle 76 may vary from about 0.5 degrees to about 2 degrees. Cavity 56 has an opening 78 therein for providing electrical connections to brush therethrough.

Referring now to FIG. 5, a view looking into cavity 56 is illustrated. The drafted surfaces of first wall 60, second wall 62, third wall 64, fourth wall 66, and positioning rib 70 are evident. If two positioning ribs 70 are used, positioning ribs should be spaced apart to prevent movement of the brush in the lateral direction.

Referring now to FIG. 6, a cross-sectional view along line 6—6 of FIG. 5 is illustrated showing ribs 70 positioned on first wall 60 and on second wall 62. The ribs extend substantially parallel to the longitudinal axis 58. The longitudinal axis 58 corresponds to the direction of travel of the brush as the brush wears. The ribs 70 hold the position of the brush despite the drafted surfaces 74 of first wall 60 and second wall 62. Thus, a draft angle 76 is illustrated between first wall 60 and positioning ribs 70. The angle 76 may be the same as that described above, that is, between about 0.5 degrees and about 2 degrees. In operation, the brush holder assembly may be molded by compression molding or injection molding. Drafted surfaces 74 are provided within cavity 56 to allow easy removal of the mold. Positioning ribs 70 are used to position the brushes 42 within cavity 56 so that the brushes are maintained substantially perpendicular to the slip rings to provide uniform wear and prevent premature wear of the brush.

While particular embodiments of the invention have been shown and described, numerous variations alternate embodiments will occur to those skilled in the art. Accordingly, it is intended that the invention be limited only in terms of the appended claims.

What is claimed is:

1. A brush holder assembly for a rotating electrical machine having a brush comprising:
    a brush holder housing having an elongated cavity therein, said cavity defined by a first wall, a second wall, a third wall, and a fourth wall, said cavity sized to receive the brush, said brush cavity having a longitudinal axis;
    at least one of said first wall, said second wall, said third wall, and said fourth wall comprising a first drafted surface; and
    a first rib positioned on said drafted surface, said first rib substantially parallel to said longitudinal axis.

2. A brush holder as recited in claim 1 further comprising a second rib positioned on said first drafted surface spaced apart from said first rib.

3. A brush holder as recited in claim 1 comprising a second drafted surface, and further comprising a second rib positioned on said second drafted surface.

4. A brush holder assembly as recited in claim 3 wherein said second drafted surface is opposite said first drafted surface.

5. A brush holder assembly as recited in claim 1 wherein said brush holder housing further comprises a regulator portion.

6. A brush holder assembly as recited in claim 1 wherein said longitudinal axis is perpendicular to a slip ring on the electrical machine.

7. A brush holder assembly as recited in claim 1 further comprising a pin and wherein one of said first wall, second wall, third wall, and fourth wall having a first hole therein, said brush having a second hole therein, said first hole and said second hole sized to receive said pin.

8. A brush holder assembly as recited in claim 1 wherein first drafted surface has a draft angle between 0.5 degrees and 2 degrees.

9. A rotating electrical machine comprising:
    a rotor having slip rings thereon;
    a brush holder housing having an elongated cavity therein, said cavity defined by a first wall, a second wall, a third wall, and a fourth wall, said cavity sized to receive a brush, said brush cavity having a longitudinal axis;
    at least one of said first wall, said second wall, said third wall, and said fourth wall comprising a first drafted surface;
    a first rib positioned on said drafted surface for positioning said brush within said cavity perpendicular to said slip ring.

10. A rotating electrical machine as recited in claim 9 further comprising a second rib positioned on said first drafted surface spaced apart from said first rib.

11. A rotating electrical machine as recited in claim 9 comprising a second drafted surface, and further comprising a second rib positioned on said second drafted surface.

12. A rotating electrical machine as recited in claim 9 wherein said second drafted surface is opposite said first drafted surface.

13. A rotating electrical machine as recited in claim 9 wherein said brush holder housing further comprises a regulator portion.

14. A rotating electrical machine as recited in claim 9 further comprising a pin wherein one of said first wall, second wall, third wall, and fourth wall having a first hole therein, said brush having a second hole therein, said first hole and said second hole sized to receive said pin.

15. A rotating electrical machine as recited in claim 9 wherein first drafted surface has a draft angle between 0.5 degrees and 2 degrees.

16. A rotating electrical machine as recited in claim 9 wherein said rotating electrical machine comprises an alternator.

17. A rotating electrical machine as recited in claim 9 wherein said first wall, said second wall, said third wall, and said fourth wall comprising a drafted surface.

18. A rotating electrical machine as recited in claim 9 wherein said third wall and said fourth wall comprise positioning ribs.

19. A rotating electrical machine as recited in claim 9 wherein said positioning ribs are substantially parallel to the longitudinal axis.

20. A rotating electrical machine comprising:

a rotor having slip rings thereon;

a pair of brushes;

a brush holder housing having a first elongated cavity and a second elongated cavity therein, said first elongated cavity and said second elongated cavity each defined by a first wall, a second wall, a third wall, and a fourth wall, said first cavity and said second cavity sized to receive said first brush and said second brush;

said first wall disposed opposite said second wall in said first cavity and said second cavity, said first wall having a first drafted surface and said second wall having a second drafted surface; and a first pair of positioning ribs positioned on said first wall of said first cavity, a second pair of positioning ribs disposed on said first wall of said second cavity, a third pair of positioning ribs positioned on said second wall of said first cavity, and a fourth pair of positioning ribs positioned on said second wall of said second cavity; each of said first pair of positioning ribs, said second pair of positioning ribs, said third pair of positioning ribs, and said fourth pair of positioning ribs positioning said brush substantially perpendicular to said slip rings.

* * * * *